United States Patent Office 3,544,268
Patented Dec. 1, 1970

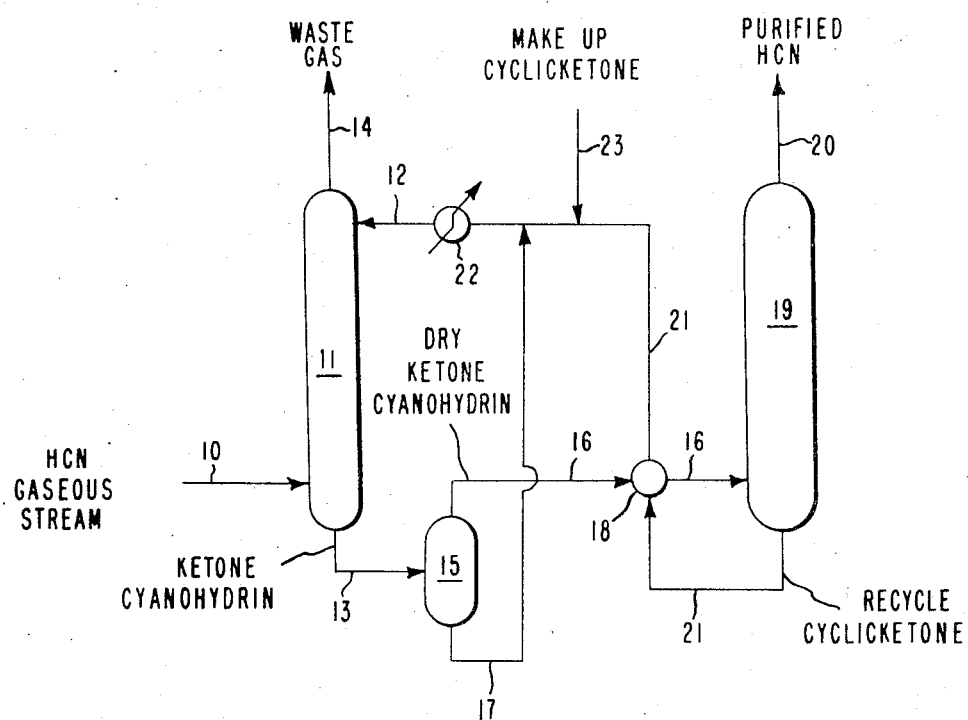

3,544,268
HYDROGEN CYANIDE RECOVERY BY KETONE CYANOHYDRIN FORMATION
Wayne Thomas Hess, Memphis, Tenn., assignor to E. I. du Pont de Nemours and Company, Wilmington, Del., a corporation of Delaware
Filed Feb. 29, 1968, Ser. No. 709,414
Int. Cl. C01c 3/02, 1/12; B01j 1/00
U.S. Cl. 23—151                                    4 Claims

ABSTRACT OF THE DISCLOSURE

Hydrogen cyanide is recovered from a gaseous stream wherein at least ammonia is present as an additional gas by reacting the hydrogen cyanide with a cyclic ketone to form the corresponding cyclic ketone cyanohydrin, which is then thermally decomposed to yield purified hydrogen cyanide and the original cyclic ketone. The cyclic ketone is recycled for further reaction with the hydrogen cyanide in the gaseous stream after it is decanted or dried to remove condensed water, if necessary. The ammonia and other waste gases from the gaseous stream are passed out of the system and the ammonia can be recovered by scrubbing with water.

BACKGROUND OF INVENTION

Field of Invention

This invention relates to the recovery of hydrogen cyanide from gaseous streams.

Prior art

The manufacture of hydrogen cyanide by processes such as those disclosed in U.S. Pat. 1,934,838, issued to Leonid Andrussow on Nov. 14, 1933 and U.S. Pat. 3,104,945, issued to William R. Jenks and Richard M. Shepherd on Sept. 24, 1963, as well as other processes, is well known. In the processes, a mixture of gases which includes a hydrocarbon, ammonia and an oxygen-containing gas (air) as the reactants is heated as it is passed through a reaction zone in which a platinum or platinum alloy catalyst is positioned.

Recovery of hydrogen cyanide in these processes is complicated to some extent by the presence of unreacted ammonia in the product gas streams. In all cases, the ammonia must be separated or neutralized to prevent polymerization of the hydrogen cyanide. The hydrogen cyanide is then scrubbed from the ammonia-free gases with water to form dilute hydrogen cyanide solutions. Final recovery of the hydrogen cyanide is made by fractionation.

SUMMARY OF INVENTION

According to the present invention there is provided a process for recovering hydrogen cyanide from a gaseous stream comprising: reacting in a first reaction zone hydrogen cyanide in said stream wherein there is at least ammonia present as an additional gas with a cyclic ketone; passing the waste gases out of the first reaction zone; passing the reaction product to a second reaction zone; thermally decomposing the reaction product to hydrogen cyanide and the original cyclic ketone; recovering from the second reaction zone purified hydrogen cyanide and returning the cyclic ketone from the second reaction zone to the first reaction zone for further reaction with the hydrogen cyanide in the gaseous stream.

BRIEF DESCRIPTION OF DRAWING

The drawing diagrammatically shows the process of the present invention.

DETAILED DESCRIPTION OF THE INVENTION

With reference to the drawing, the hydrogen cyanide produced by the reaction of ammonia, methane and oxygen (from air) is in a gaseous stream which contains ammonia and may contain any or all of hydrogen, methane, carbon monoxide, oxygen, nitrogen, argon and water. This gaseous stream is fed through line 10 into the bottom of a pressurized absorber column 11 preferably operated at a pressure of about 1 to 3 atmospheres and a temperature of about 5 to 80° C. A cyclic ketone, such as cyclohexanone, or alkyl substituted cyclic ketone, is fed into the top of column 11 through line 12, and the cyclic ketone reacts with the hydrogen cyanide to form the corresponding cyclic ketone cyanohydrin which leaves the bottom of column 11 as a liquid through line 13. The waste gases, i.e., all of the incoming gases minus the absorbed hydrogen cyanide, pass on through column 11 and leaves through line 14. Subsequently, the ammonia can be recovered by scrubbing with water and the remainder of the waste gases burned.

The cyclic ketone cyanohydrin in line 13 is fed into a decanter 15 where water condensed in column 11 is separated and returned to column 11 through line 17. The cyanohydrin in line 16 is then fed through heat exchanger 18 into tower 19 wherein the cyanohydrin is thermally decomposed to the pure hydrogen cyanide which exits tower 19 through line 20 for further processing and the original cyclic ketone exits tower 19 through line 21 for recycling back to column 11. Recycled cyclic ketone in line 21 exchanges heat with the cyclic ketone cyanohydrin feed 16 in exchanger 18, is mixed with make-up cyclic ketone from line 23 and decanted water stream 17 and the mixed stream is fed into column 11 under pressure by way of cooler 22 and line 12. The tower 19 is preferably operated at 0.1 to 3 atmospheres pressure and at a temperature within the range of 110° to 170° C.

The preferred cyclic ketones are those containing 5 to 7 carbon atoms in the ring and alkyl substituted cyclic ketones of 5 to 7 carbon atoms in the ring. The substituted alkyl groups may contain from 1 to 15 carbon atoms. There may be one or more alkyl groups and, if more than one, they may be the same or different. This preferred group of cyclic ketones exhibit a strong preference to form stable cyanohydrins. This is evidenced by their dissociation constants ($K_D$). Small values of $K_D$ indicated maximum conversion of ketone and hydrogen cyanide to the cyanohydrin. In general, the cyclic ketone cyclohexanone exhibited $K_D$ values of 0.003 to 0.016, depending on temperature and the solvent system. This ability to quickly and tightly bind the hydrogen cyanide is most important in order to prevent hydrogen cyanide polymerization in the presence of ammonia or ammoniacal compounds. On the other hand, the aliphatic ketones, such as di-isobutyl ketone yields a $K_D$ value of 5.8 and the aromatic ketones, such as acetophenone yields a $K_D$ value of 780. Each of these latter ketones results in considerable hydrogen cyanide polymerization, whereas for the cyclic ketones no polymer is formed. The $K_D$ value, therefore, is a good means of predicting which ketones will be effective for hydrogen cyanide recovery. In general, the $K_D$ value should be less than 0.02 in the temperature range of 10–60° C.

Once the hydrogen cyanide has been tied up as the cyanohydrin and separated from the main ammonia containing stream, polymerization is no longer of major concern, and the dissocation constant can be icreased by heating. A typical $K_D$ profile for a preferred compound, cyclohexanone, is 0.0006 at 20° C., 0.003 at 45° C., and 0.0044 at 50° C. Upon further heating to near its normal boiling point (150–155° C.), dissociation of the cyanohydrin is near complete yielding hydrogen cyanide free of ammonia and the parent cyclohexanone.

A partial list of ketones studied and their corresponding cyanohydrin $K_D$ values augmented by values found in the literature are:

| Ketone | Temp., °C. | $K_D$ | Solvent |
|---|---|---|---|
| Cyclohexanone | 45 | 0.00307 | Dodecane. |
| Do | 50 | 0.00435 | None. |
| Do | 45 | 0.0159 | 1, decanol. |
| Do | 21–27 | 0.0006–0.001 | 95% ethanol. |
| 2-Methylcyclohexanone | 21–27 | 0.0003–0.0011 | Do. |
| 2,6-Dimethylcyclohexanone | 21–27 | 0.0048 | Do. |
| 4-Tert-butylcyclohexanone | 21–27 | 0.00023–0.00059 | Do. |
| Do | 21–27 | 0.0024 | 1:1 ethanol. |
| 3-Methylcyclohexanone | | 0.003 | |
| 4-Methylcyclohexanone | | 0.0013 | |
| Cyclopentanone | | 0.015 | |
| Cycloheptanone | | 0.08 | |
| Acetophenone | 26–29 | 780 | None. |
| Di-isobutyl ketone | 22 | 5.8 | Do. |
| Diphenyl ketone | | (¹) | |

¹ No reaction.

From the above listing, it is readily seen that the saturated cyclic ketones, especially those whose parent ketone is cyclohexanone or cyclopentanone, all have $K_D$ values less than 0.02. The $\alpha,\alpha'$-disubstituted cyclohexanone, 2,6-dimethylcyclohexanone has perhaps a six-fold greater $K_D$ value than the parent cyclohexanone, within the same solvent system, but still binds hydrogen cyanide substantially more tightly than do the aromatic or acrylic aliphatic ketones.

Illustrative cyclic ketones are cyclopentanone, cyclohexanone, cycloheptanone, 2 - methylcyclohexanone, 3-methylcyclohexanone, 4 - methylcyclohexanone, 2,3 - dimethylcyclohexanone, 2,4-dimethylcyclohexanone, 2,5-dimethylcyclohexanone, 2,6 - dimethylcyclohexanone and other higher mono- and disubstituted alkyl homologs. In the case of solid cyclic ketones, a suitable solvent such as a high boiling nitrile or alcohol is used. Specific gravity adjustment can be accomplished by addition of a water-immiscible solvent such as di-isobutylcarbinol.

The higher molecular weight cyclic ketones are preferred because they are higher boiling and have low vapor pressures. This minimizes their loss out vapor stream 14 and also prevents their leaving tower 19 with the hydrogen cyanide in line 20.

The invention can be further illustrated by the following examples with percentages by weight unless otherwise indicated.

EXAMPLE 1

To 18.9 gm. of cyclohexanone and 4.3 gm. of 10% NH₄OH in a 50 ml. Erlenmeyer flask at room temperature was added, with agitation, 2.8 gm. of liquid hydrogen cyanide with a hypodermic syringe. The hydrogen cyanide was added just below the surface of the liquid in the flask. Since the reaction is exothermic, the flask was cooled to keep the temperature at a maximum of 69° C. The solution was allowed to cool and was then analyzed for free hydrogen cyanide and cyclohexanone cyanohydrin (CHCH).

Analysis:
| | | |
|---|---|---|
| Free hydrogen cyanide | percent | 0.16 |
| CHCH | do | 53.11 |
| CHCH yield | do | 96.3 |
| $K_D$ at 50° C. | | 0.00435 |

The above-prepared cyclohexanone cyanohydrin was thermally decomposed at 110–151° C. and atmospheric pressure by heating in a round bottom flask with an electric mantle heater. The gases from the decomposer were scrubbed in boric acid solution and finally in 25% NaOH.

Analysis:
| | Grams |
|---|---|
| Hydrogen cyanide in boric acid | 4.92 |
| Hydrogen cyanide in NaOH | 4.06 |
| Total | 8.98 |

| | | |
|---|---|---|
| Hydrogen cyanide in initial solution | grams | 9.8 |
| Percent decomposition | | 91.6 |

What is claimed is:

1. A process for recovering hydrogen cyanide from a gaseous stream comprising: reacting at a pressure of about 1 to 3 atmospheres and a temperature of about 5 to 80° C. in a first reaction zone hydrogen cyanide in said stream wherein there is at least ammonia present as an additional gas with a cyclic ketone; passing the waste gases out of the first reaction zone; passing the reaction product to a second reaction zone; thermally decomposing the reaction product to hydrogen cyanide and the original cyclic ketone at a pressure of about 0.1 to 3 atmospheres and a temperature of about 110 to 170° C.; recovering from the second reaction zone purified hydrogen cyanide and returning the cyclic ketone from the second reaction zone to the first reaction zone for further reaction with the hydrogen cyanide in the gaseous stream.

2. The process of claim 1 wherein the cyclic ketone is cyclohexanone.

3. The process of claim 1 wherein the cyclic ketone is mono- or disubstituted alkyl cyclohexanones.

4. The process of claim 1 wherein the cyclic ketone and hydrogen cyanide react to form a cyanohydrin whose dissociation constant ($K_D$) is less than 0.02.

References Cited

UNITED STATES PATENTS

| 1,984,415 | 12/1934 | Macallum | 260—465.6 |
| 2,859,090 | 11/1958 | Karchmer et al. | 23—2 |
| 3,147,069 | 9/1964 | Höger et al. | 23—2 |

OSCAR R. VERTIZ, Primary Examiner

H. S. MILLER, Assistant Examiner

U.S. Cl. X.R.

23—2, 196, 283; 260—465.6